United States Patent
Jha et al.

(10) Patent No.: US 11,140,025 B2
(45) Date of Patent: Oct. 5, 2021

(54) MISSION CRITICAL PUSH NOTIFICATION IN HIGH-RELIABILITY INFORMATION CENTRIC NETWORK

(71) Applicant: Intel Corporation, Santa Clara, CA (US)

(72) Inventors: Satish Chandra Jha, Hillsboro, OR (US); S. M. Iftekharul Alam, Hillsboro, OR (US); Yi Zhang, Portland, OR (US); Eve M. Schooler, Portola Valley, CA (US); Ned M. Smith, Beaverton, OR (US); Kathiravetpillai Sivanesan, Portland, OR (US); Venkatesan Nallampatti Ekambaram, Hillsboro, OR (US); Srikathyayani Srikanteswara, Portland, OR (US); Kuilin Clark Chen, Hillsboro, OR (US); Zongrui Ding, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/456,443

(22) Filed: Jun. 28, 2019

(65) Prior Publication Data

US 2019/0327134 A1 Oct. 24, 2019

(51) Int. Cl.
*H04L 12/24* (2006.01)
*H04L 12/26* (2006.01)
(Continued)

(52) U.S. Cl.
CPC ........ *H04L 41/0803* (2013.01); *H04L 5/0055* (2013.01); *H04L 41/12* (2013.01);
(Continued)

(58) Field of Classification Search
None
See application file for complete search history.

(56) References Cited

U.S. PATENT DOCUMENTS

| | | | |
|---|---|---|---|
| 2012/0173900 A1* | 7/2012 | Diab | H04L 12/40045 713/310 |
| 2013/0024706 A1* | 1/2013 | Katar | G06F 1/26 713/321 |

(Continued)

OTHER PUBLICATIONS

Abraham, Hila Ben, "Decoupling Information and Connectivity via Information-Centric Transport", 5th ACM Conference on Information-Centric Networking (ICN '18), Boston, MA, USA, (Sep. 2018), 13 pgs.

(Continued)

*Primary Examiner* — Adnan Baig
(74) *Attorney, Agent, or Firm* — Schwegman Lundberg & Woessner, P.A,

(57) ABSTRACT

Systems and techniques for mission critical (MC) push notification mechanism in a high-reliability (HR) information centric network (ICN) are described herein. For example, a node may test network links to other nodes to classify the other nodes into proximate nodes and non-proximate nodes based on a reception metric. The node may then elect a set of leader nodes from the proximate nodes. Here, the set of leader nodes are selected based on link quality between respective leader nodes and non-proximate nodes. The node may detect an MC event and create an ICN data packet that contains data from the MC event. The node may then transmit the ICN data packet to the set of leader nodes that then relay the ICN data packet to the non-proximate nodes.

24 Claims, 11 Drawing Sheets

(51) Int. Cl.
*H04L 29/08* (2006.01)
*H04L 5/00* (2006.01)
(52) U.S. Cl.
CPC .......... *H04L 41/5003* (2013.01); *H04L 43/50* (2013.01); *H04L 67/26* (2013.01)

(56) References Cited

U.S. PATENT DOCUMENTS

| | | | | |
|---|---|---|---|---|
| 2013/0060962 | A1* | 3/2013 | Wang | H04L 67/327 |
| | | | | 709/238 |
| 2018/0097850 | A1* | 4/2018 | Baek | H04L 65/4061 |
| 2019/0280761 | A1* | 9/2019 | Hu | H04W 24/08 |

OTHER PUBLICATIONS

Amadeo, Marica, "Internet of things via named data networking: The support of push traffic", IEEE 2014 International Conference and Workshop on the Network of the Future (NOF), (2014), 1-5.

Zhang, Jianqing, "iHEMS: An information-centric approach to secure home energy management", IEEE International Conference on Smart Grid Communications (SmartGridComm '12), (Nov. 2012), 217-222.

Zhu, Z, "ACT: Audio Conference Tool over Named Data Networking", ACM ICN Workshop, (2011), 6 pgs.

* cited by examiner

MISSION CRITICAL PUSH NOTIFICATION IN HIGH-RELIABILITY INFORMATION CENTRIC NETWORK

TECHNICAL FIELD

Embodiments described herein generally relate to computer networking and more specifically to a mission critical (MC) push notification mechanism in a high-reliability (HR) information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

As ICN becomes more widespread, some additional issues may arise due to the generally subscription-based model of ICN. For example, use cases with industrial Internet-of-Things (IoT) or Smart Home or Office devices in which a node detects a mission critical (MC) event—such as exposure to toxic or combustible gases, oxygen depletion in confined spaces, gas leaks, fire, etc.—for which several users or other nodes need to be immediately informed with high reliability. As used herein, whether an event is mission critical is dependent upon a given application. However, MC events represent events that, if not detected, may cause failure to a service or application. In some of these cases, the intended recipient (e.g., users or nodes) may not be available (e.g., awake) during the MC event, or later at the same time. This may be a common scenario as power savings on many devices, such as battery powered devices, is increasingly had via aggressive low-power (e.g., sleep) modes. In some examples, the recipient nodes may use different radio access technologies (RATs).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
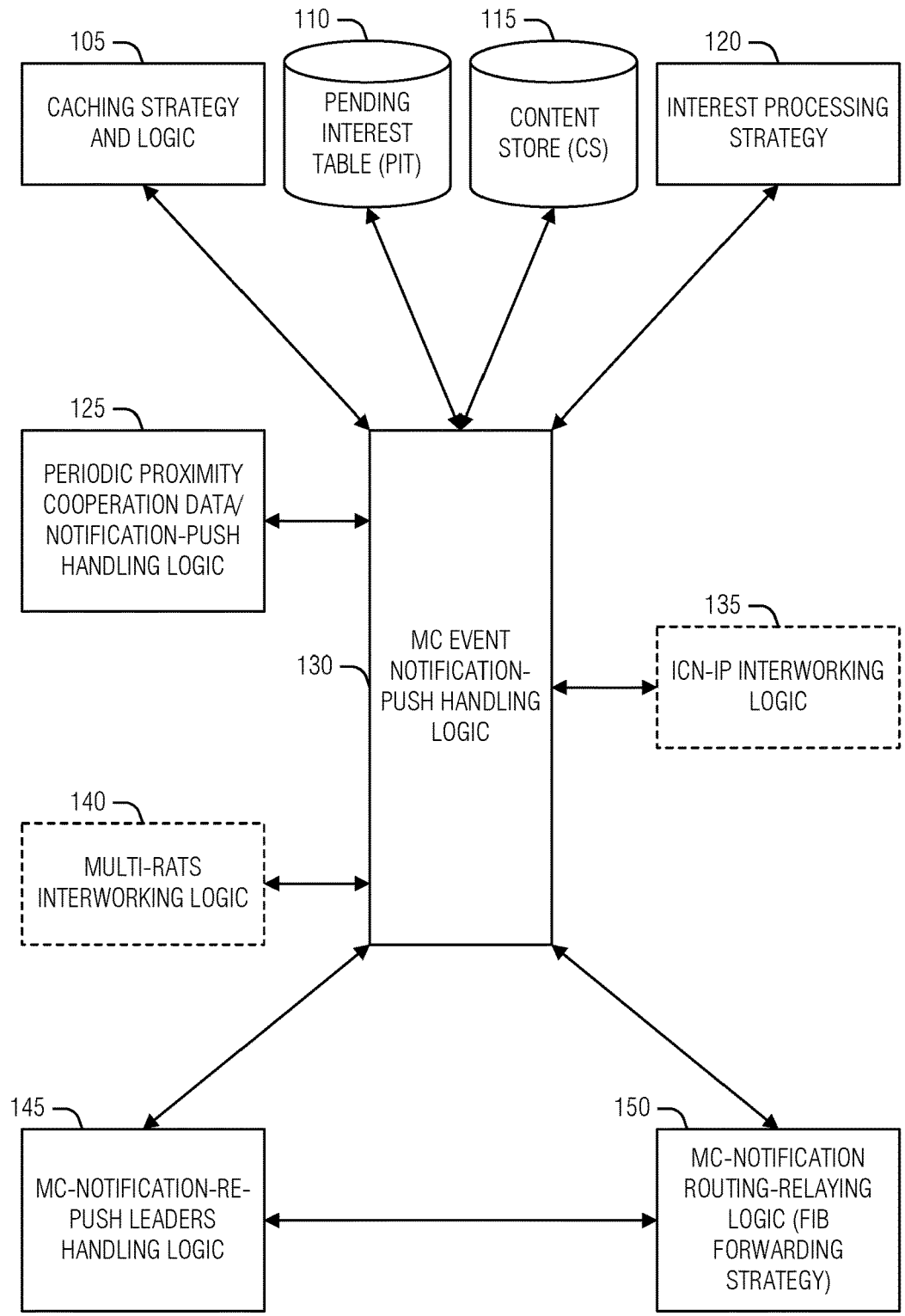
FIG. 1 is a block diagram of an example of an environment including a system for MC push notification in an HR ICN, according to an embodiment.
Figure 2A:
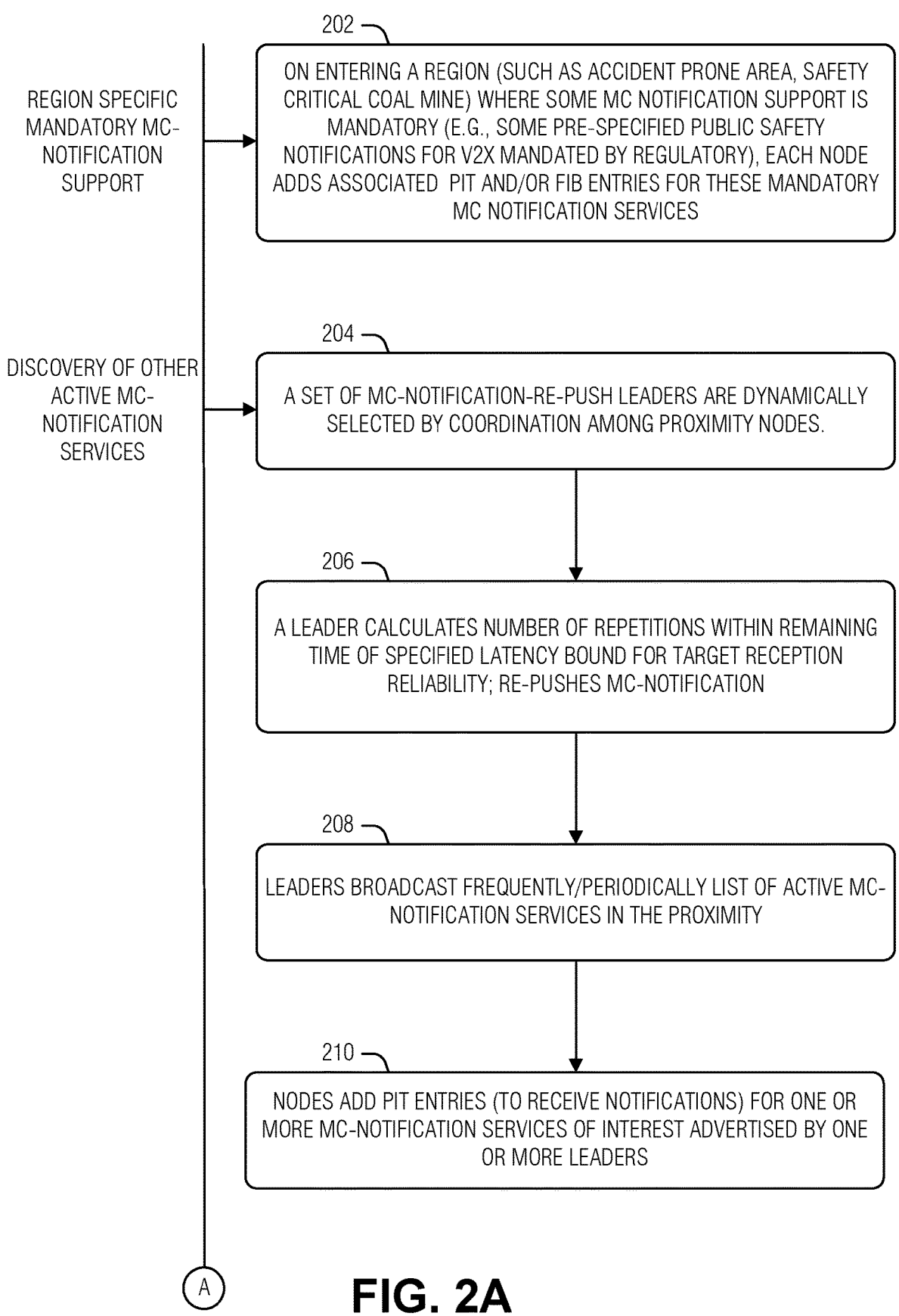
FIGS. 2A-2D illustrate examples of operations to enable MC push notification in an HR ICN, according to an embodiment.
Figure 2B:
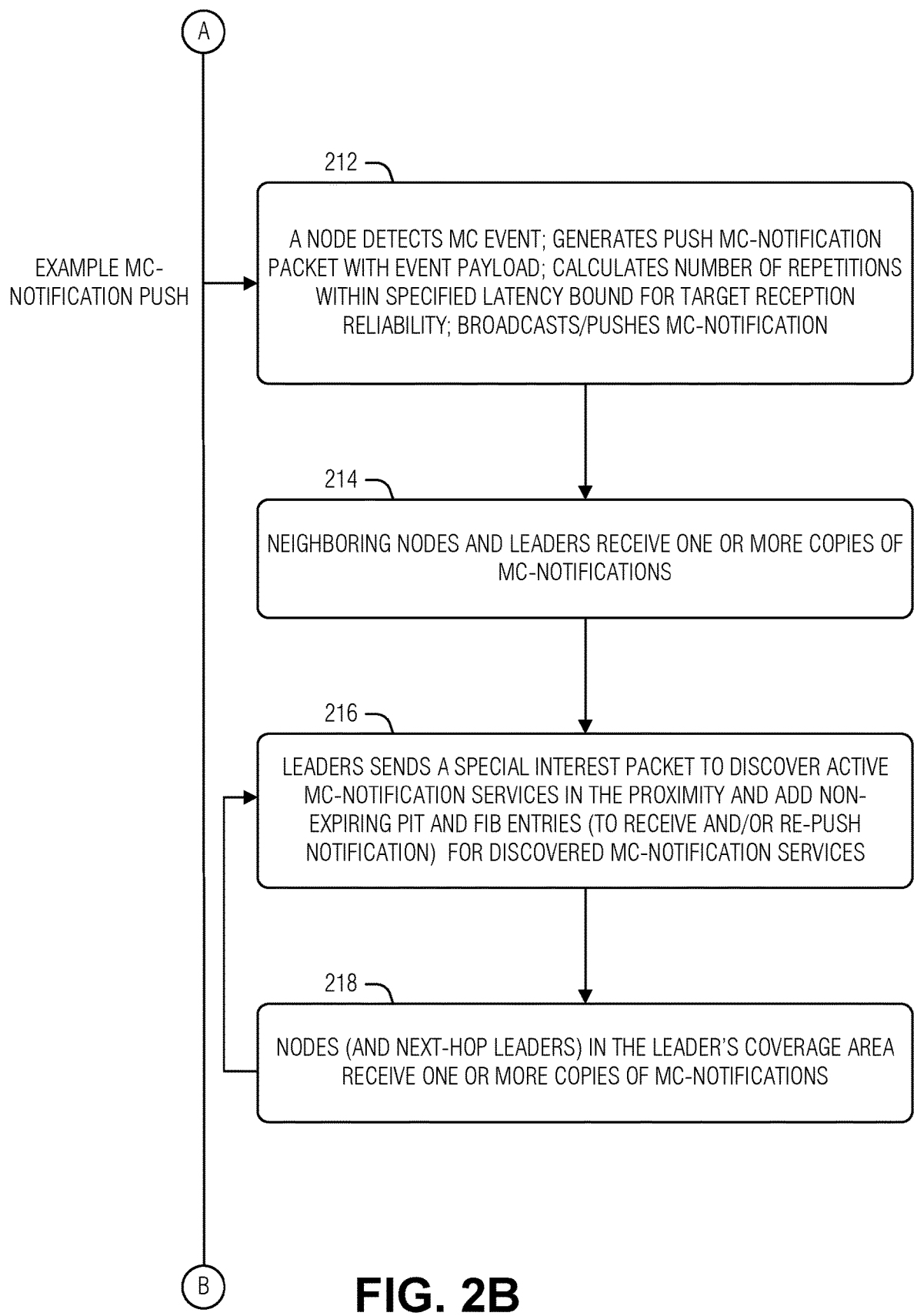
Figure 2C:
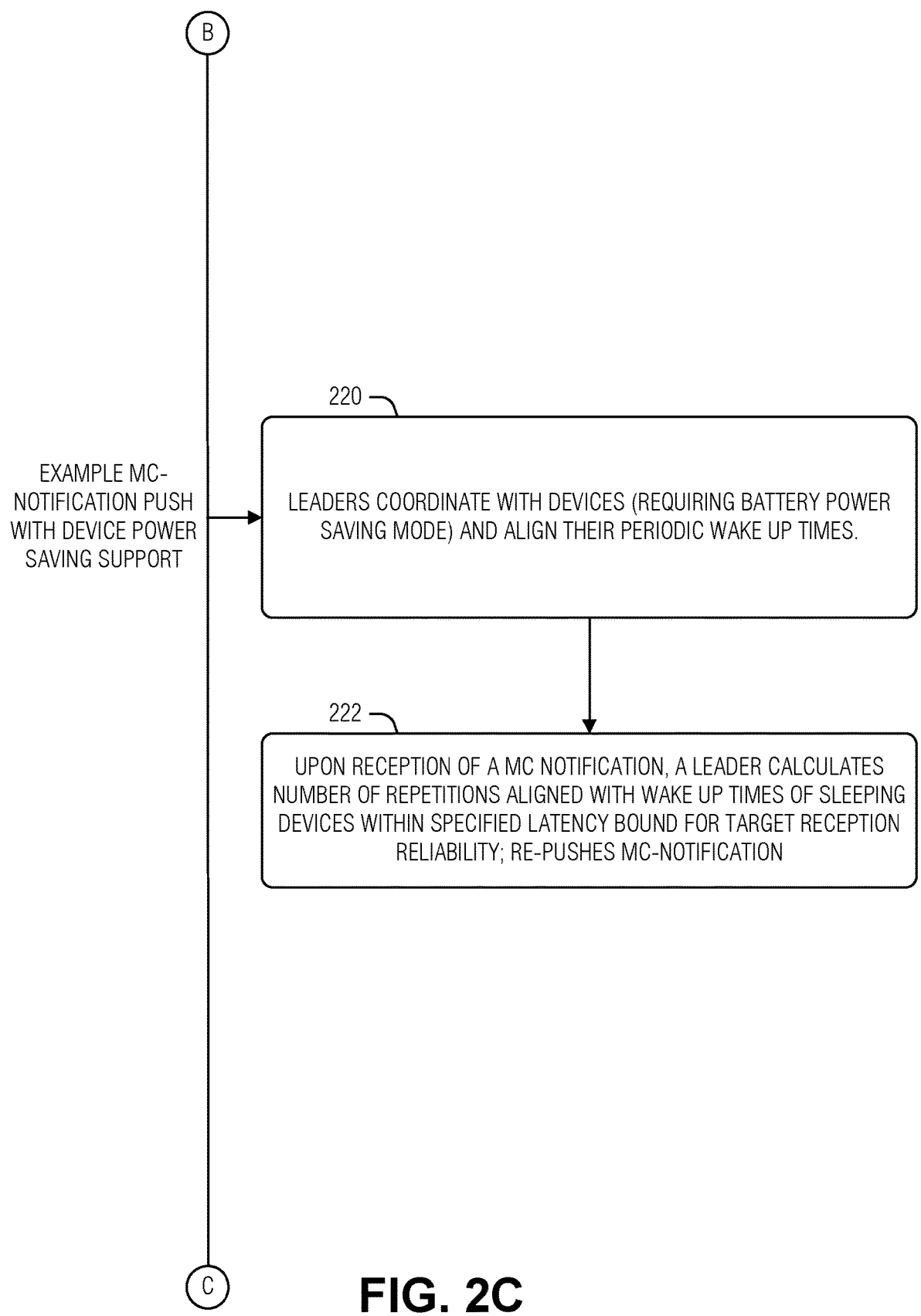
Figure 2D:
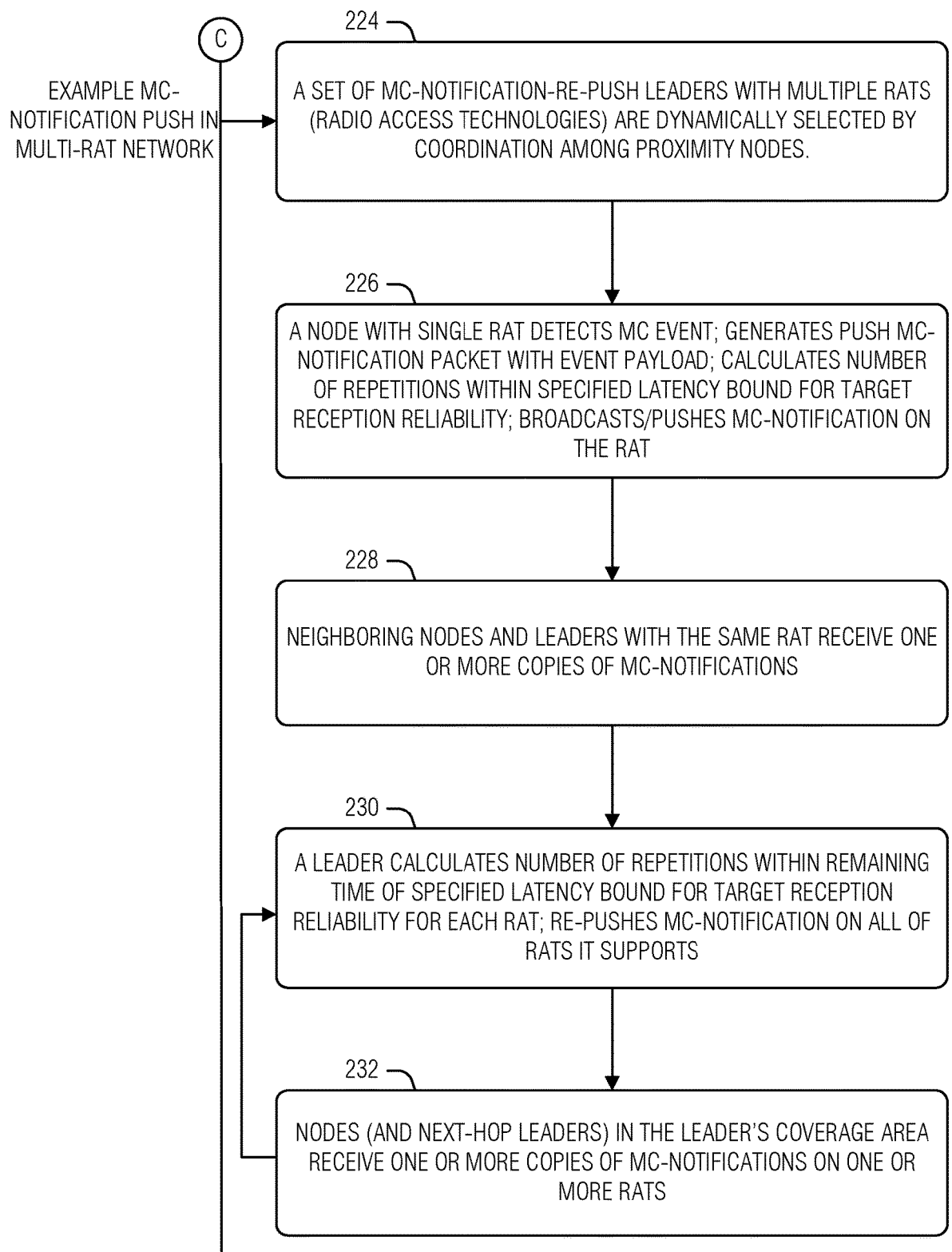

The MC device factors described above may all contribute to a difficulty in running such MC devices over an ICN. To address these issues, an event triggered push notification in ICN is described herein. This will enable MC notification (e.g., data push, delivery, etc.) to all proximate nodes within a given time bound. These MC event push notifications are also relevant in several safety critical use cases in vehicular networks. As used herein proximity (e.g., to be proximate to) is defined in terms of maximum absolute distance around the event location to be covered. The number of network hops permitted in these scenarios may depend on the RAT. The proximate area and target latency bound may depend on each other. An efficient non-MC periodic push ICN mechanism may also be used to enable notifications or push-style data delivery to a group of proximate nodes in some use cases. For example, a periodic cooperation (e.g., awareness, hello, basic-safety message, etc.) exchange may be important in vehicular contexts as well as in industrial networks maintain up-to-date information between neighbor nodes.

The event triggered ICN push notification described herein enables MC notifications to proximate nodes with high reliability, even when the recipient nodes are in power saving modes. The technique also supports heterogeneous networks—such as differing RATs, hardwired networks (e.g., ethernet, coax, fiber, etc.), and even across network protocols (e.g., ICN to IP).

Some attempts at push notifications in ICN include one-time, periodic, or persistent interests to enable a range of pub-sub semantics. These persistent interest semantics may allow for a push mechanism that is triggered whenever interesting event data arrives on the pub-sub channel for redistribution to those subscribed. In another example, information may be decoupled from the connectivity plane for improved operation over intermittently connected or lossy links. Also, solicitation of evidence from all sensor nodes that are proximate to an anomalous event has been explored. Here, proximity is defined in terms of a delta from a point in time and space. These ideas have a few common features that differ from the present technique. For example, these strategies support push traffic over named data networking based on inclusion of small data in the interest packet as part of the naming component, use of unsolicited data, or use of long-lived interest packet.

Previous attempts to design ICN notifications have issues with respect to MC events. For example, they often fail to time-bound communications in order to ensure timely delivery of the data. Further, some transport layer solutions may fail to address unavailable recipients, fail to ensure timely delivery, or using high-overhead polling mechanisms. For example, solutions for notification push in ICN, such as virtual interest polling and long-lived interest-based solutions, generally require consumers to transmit or re-transmit interest packets to get push notifications, this may incur significant overhead that gets worse for large numbers of consumers (e.g., receivers). Some techniques also lack multi-hop routing.

While the existing ideas may provide basic push traffic forwarding, they do not provide additional mechanisms to enhance reception coverage or reliable data delivery, which is important for MC applications. They also generally lack support for nodes in power saving mode and lack support for heterogeneous network cases.

Described herein are several solutions to the issues noted above. The MC event triggered notification push to proximate nodes described herein ensures high reception reliability within bounded time. The mechanism also works with devices in power saving modes and supports heterogeneous network cases such as network of nodes with various RATs, or between ICN and IP, for example. Some features of the MC event triggered notification push to proximate nodes may include Dynamic selection of MC-Notification-Re-Push leaders in advance of an MC event. Here, the leaders may relay or re-broadcast MC notifications or data (e.g., received from the MC event detecting node) to ensure reception of MC notifications by nodes in the targeted proximity with high reliability and within a specified time bound. In an example, all nodes or selected leaders send an acknowledgment (ACK) in response to reception of an MC notification to the MC event detecting node.

In an example, the leaders may determine time or number of repetitions for relay (e.g., re-push) of an MC notification to ensure that the MC notification is received by presently unavailable nodes within their coverage area. with high reliability and within a specified time bound. In an example, leaders may wake nodes in power saving mode through a low-power network interface. Additional examples and details are provided below.

The described solution efficiently enables notification of an MC event to proximate nodes ensuring high reception reliability within bounded time in ICN based networks, such as industrial IoT or vehicular networks. Its support of heterogenous networks and solution for low-power or unavailable nodes provides a near universal solution to many issues within a variety of deployment scenarios.

FIG. 1 is a block diagram of an example of an environment 100 including a system for MC push notification in an HR ICN, according to an embodiment. The illustrated logic (e.g., circuitry) represents select building blocks on a node for the MC-notification push mechanism. The logic illustrated with dashed lines may be exclusive to leader nodes. Some of the illustrated components are general to all ICN nodes, such as the pending interest table (PIT) 110 and corresponding interest processing circuitry 120, and the content store 115 and corresponding caching circuitry 105.

As illustrated, the MC event notification-push handling logic 130 is configured to handle push messages with time and reliability requirements. Additional details with regard to this operation are described below, for example, with reference to FIG. 2. The routing of push messages may be facilitated by the mc-notification-routing-relaying logic 150, which may modify forwarding interest base (FIB) operation from that of a standard ICN node.

The periodic proximity cooperation data/notification-push handling logic 125 may be configured to process periodic data or notification transmission and reception. The MC-notification-re-push leaders handling logic 145 may be configured to select leaders. The multi-RATs interworking logic 140 may be present on leader nodes and supports heterogeneous network operation. For example, it may process receipt an MC-notification on one RAT and re-push the same MC-Notification on another RAT. Similarly, the ICN-IP interworking logic 135 may be on leader nodes to enable ICN-to-IP communications via a receive-translate-push arrangement.

In an example, a periodic non-MC notification may be implemented by the system. Here, each node may keep an entry in the PIT 110—such as /Periodic-Proximity-Notification-Push-Prefix: AppFace-Periodic—to forward any periodic proximity data to a specified (e.g., related) application. The table below illustrates an example of the PIT entry:

| PIT Entry Example | |
| --- | --- |
| Prefix | Face(s) |
| /Periodic-Proximity-Notification-Push-Prefix | AppFace-Periodic |

In an example, the network already has support for periodic data or notification transmissions. Here, each node may be arranged to add the PIT entry when joining the network. In an example, the PIT entry non-expiring. Thus, even after getting a periodic data or notification transmission, the node will keep the PIT entry for future potential periodic data or notifications. In an example, the PIT entry expires. Here, the PIT entry may be renewed by the node after each periodic data or notification transmission is received.

The periodic notification or data may be composed of a naming part and a content part. Here, the content part may follow a pre-defined format known to all proximate nodes. The naming part of the periodic message may include a prefix (e.g., Periodic-Proximity-Notification-Push-Prefix) to identify it as a periodic notification. The periodic message may carry basic information about neighbor nodes to the sender, such as node ID, node type, location, link speed, etc. This may help each node maintain a neighbor list and other information about the proximate nodes. In vehicular networks this mechanism may be used to transmit (e.g., broadcast) periodic safety, awareness, or other notification messages, such as a basic safety message (BSM), a cooperative awareness message (CAM), among others.

FIGS. 2A-2D illustrate examples of operations to enable MC push notification in an HR ICN, according to an embodiment. As illustrated, differing techniques are listed to the left of the vertical line, the corresponding procedures starting with an arrow crossing the line and point to an operation. The vertical line itself represents a continuum of techniques that may be used together or separately. In a proximity or region, multiple MC notification services may be active at the same time. A node may join one or more of these MC notification services by setting PIT or FIB entries as described below.

Some MC-Notification services in a region/proximity might be mandatory for all nodes in a specific network. For example, some pre-specified public safety MC-Notification supports may be mandatory (e.g., as established by a regulatory agency) in vehicular network. Similarly, another type of MC-notification may be mandatory for workers (e.g., carrying sensor devices) entering a risky environment, such as a mine, refinery, etc. In these examples, once a node is provided with the MC-notification, such as when entering an MC region—such as an accident-prone area, a safety critical coal mine, a tsunami prone area, etc.—the node adds associated PIT or FIB entries for these mandatory MC-Notification services (operation 202).

Other examples of MC-notification services discovery may include using leaders (e.g., nodes designated as leaders). A set of nodes may be selected as leaders dynamically by the coordination among proximate nodes in such a way that cumulative coverage of selected leaders covers a target area (operation 204). In an example, the coordination of nodes to negotiate selection of the leaders may be accomplished via periodic non-MC data communications (e.g., via standard ICN techniques). Generally, leaders are responsible for relaying (e.g., re-pushing) MC-notifications that it receives.

In an example, a node with full-duplex support is given higher priority in leader selection. Thus, given two nodes with the same coverage capability to cover the target area, the node with full duplex will be selected over the node with half-duplex, all else being equal. This enables the selected nodes to transmit MC-notifications at the same time MC-notifications are received, further reducing processing latency in the flow of MC-notifications throughout the network.

A node selected as a leader (or otherwise designated as an MC notification relay) may be configured to maintain a non-expiring FIB entry for the relay, such as the following:

| FIB Example | |
|---|---|
| Prefix | Face(s) |
| /MC-Proximity-Notification-Push-Relay-Prefix | Face-MC-Broadcast-Radio |

In an example, a relay node implements (e.g., respects) a quality-of-service (QoS) profile set by the producer of the MC notification. For example, if a latency bound is set by producer, the relay node will prevent further relay or response to the MC notification if it is beyond the time limit of the latency bound.

In an example, the leader (e.g., at the ICN layer) may decide number of repetitions (e.g., hops) to achieve target reliability within a latency bound (operation 206). This operation 206 may be dependent upon preconfigured network reliability figures, or upon signaling from another entities (e.g., a layer two (L2)) facility of the node. For example, if the L2 provides RAT performance metrics, these metrics may form the basis upon which the number of times to repeat MC notification to achieve a desired level of reliability. In an example, the repetition count may be selected based on QoS parameters of the relay message. The repetition of the MC notification ensures that proximate nodes receive the MC notification at least once.

Leaders may send an ICN discovery packet across the network. In an example, the ICN discovery packet is a type of interest that may vary from a typical interest in that the name is matched by every node, and which is transmitted a defined number of network hops without regard to whether a present node matches the name because they may all match. Nodes with information about an MC-notification service respond to the ICN discovery interest. Such nodes may include those that have previously sent some type of MC notification, or may response based on being classified as a node that may detect an MC event based on historic data about what types MC events may occur in the target area.

Leaders then may periodically broadcast a list of discovered MC-notification services (operation 208). Proximate nodes may then add PIT entries for one or more of the advertised MC-notification services to receive notification of MC events from these services (operation 210). Thus, in an example, for each MC-notification service to which a node subscribed, the node maintains an entry in its PIT—such as /MC-Proximity-Notification-Push-Prefix: AppFace-MC—to forward the corresponding "MC-Proximity-Notification" to a MC application or a higher layer MC event handling entity. In an example, this PIT entry is non-expiring. Thus, even after getting an MC notification, the node will keep the PIT entry for future potential MC notifications. In an example, the PIT entry does expire. Here, the PIT entry may be renewed after each MC notification, or after a keep-alive notification that signals a potential MC-Notification.

In an example, a single common PIT entry may be added to receive all or multiple subscribed MC notification services. Here, the PIT entry corresponds to the multiple services, thus saving space in the PIT. The following is an example of such a PIT entry:

| PIT Example | |
|---|---|
| Prefix | Face(s) |
| /MC-Proximity-Notification-Push-Prefix | AppFace-MC | or, between leader and non-leader nodes:

| PIT Example (Non-Leader Nodes) | |
|---|---|
| Prefix | Face(s) |
| /MC-Proximity-Notification-Push-Prefix | AppFace-MC |

| PIT Example (Leader Nodes) | |
|---|---|
| Prefix | Face(s) |
| /MC-Proximity-Notification-Push-Prefix | AppFace-MC |
| /MC-Proximity-Notification-Push-Prefix | Face-Relay-MC |

In an example, a time stamp or a sequence number (SN) may be included in the "MC-Proximity-Notification-Push-Prefix." This time stamp or SN enables the node to identify whether it has already received the MC notification. This may be important because, as noted above, the MC notifications may be sent repeatedly to ensure reception over, for example, an unreliable wireless link without incurring the latency penalty for waiting for acknowledgment time-out and retransmission.

In an example, a node may maintain its own SN. In an example, a common pool of SNs may be maintained for all MC-notification services or a separate SN pool may be maintained for each MC-notification service, or service type. In an example, the SN may be included with a sending node identification (ID), which is unique at least within the target area. In an example, the SN may be combined or included in the MC-Notification service type.

Putting some of the features noted above together, an example MC notification may proceed as follows. A node may detect an MC event and generate a push MC notification (operation 212). The data for the MC notification may be obtained by an application running on the node, such as a monitoring application. This higher layer (higher network layer) entity may also provide a latency bound (e.g., maximum time for which the notification is pertinent or valid), a target reception area, or reliability requirements. The ICN layer creates the ICN packet with a naming prefix that specifies the MC data type and QoS parameters (e.g., derived from the latency, reliability, target coverage area, etc.). Here, the ICN packet is an ICN data packet which will be delivered to subscribers via the PIT entries noted above.

In an example, the ICN layer of the node determines the number of times to repeat transmission of the MC notification to achieve the target reliability within the latency bound. As noted above, this may be based on lower layer (e.g., physical link layer or media link layer) metrics, or it may be based on the QoS parameters (e.g., in the absence of link metrics, a predefined number of repetitions may be used given the QoS requirements).

Once the MC notification is created by the ICN layer, the ICN layer passes message to L2 for transmission (e.g., broadcast) over a radio interface. As part of this handoff, ICN layer may also pass the QoS parameters to L2. In an example, passing the QoS parameters includes transforming the ICN layer QoS values into equivalent, or as near as possibly equivalent, values understood by the L2. In an example, when, for example the repetition of the MC notification is not done by the ICN layer, the L2 may calculate the number of times to send the MC notification to achieve a reliability target within a latency bound. In this example, the L2 may reserve resources for initial transmission of the MC notification and its repetitions. This redundancy helps to achieve higher reception reliability and may address half-duplex issues. For example, by repeating the MC notification transmission, most of the proximate nodes will receive the message at least once.

Following the initial ICN transmission of the MC notification, neighboring (e.g., proximate) nodes and leaders receive one—or likely more when MC notification repetition is employed—ICN data packets with the MC notification (operation 214). These receiving leaders then forward the MC notification based on the PIT and FIB entries created during MC service discovery (operation 216). As these messages are received (operation 218), the cycle may repeat, for example, via next-hop leaders via the PIT or FIB entries generated from the service discovery (operation 216).

When nodes may be unavailable, for example, due to being in a low-power mode, some additional techniques may be employed. Note that, in some use cases, devices or nodes may be battery driven and device power saving may be crucial. For example, workers may work in safety-critical industrial environments where workers have to wear low power battery-operated detectors to monitor exposure to toxic or combustible gases, oxygen depletion in confined spaces, gas leaks, or sudden outbursts of fire. To maximize device battery life, nodes may sleep and wake up periodically to listen to notifications. To ensure, reception of MC notifications, the following techniques may be employed singly or in combination.

In an example, nodes may align wake schedules via, for example, the periodic broadcasts described above. Thus, without coordination, these devices may have different, and possibly non-overlapping wake periods, but, after coordination, have largely overlapping periods in which the device is available. In an example, this coordination is performed by a leader node (operation 220).

In an example, the coordinated wake-up intervals are multiples of each other. This helps to ensure overlapping periods of wakefulness while still enabling some devices to have short wake periods to conserve energy. In an example, a maximum sleep period is established such that the node will wake and be able to handle an MC notification relay within a latency bound. In an example, the latency bound is the smallest as established via the discovery process described above.

When an MC event is detected, the node transmits an MC notification multiple times so that nodes with longest wake up period will get at least one reception opportunity (operation 222). In an example, the re-transmissions are based on the periodic wake coordination. In an example, the re-transmissions are random. A random re-transmission technique may help to catch nodes that are not quite conforming to the sleep-wake coordination.

In an example, node with shorter sleep-periods, or longer wake-periods, may receive duplicate MC notifications. Using the SN or time-stamp technique noted above, the nodes may discard these duplicate MC notifications. Thus, for example, combining an SN maintained by the node with the MC notification sending node's ID, produces a value that all of the duplicates will match.

In an example, leaders remain awake. In an example, leaders may sleep, but have a sleep-wake schedule coordinated to overlap with all wake periods of the other nodes. Thus, when a node detects and MC event and transmits the MC notification to a leader, the leader will be available to relay the MC notification. The leader may acknowledge the initial MC notification receipt, which may be used by the originating node to go back into a power saving mode.

Being awake at the same time is not the only issue for reliable and timely MC notification delivery; multiple access technologies, such as RATs, may also present a challenge. An assumption may be made that at least some nodes have multiple radio stacks that enable the node to receive on one RAT and then inform other nodes on one or more other RATs or wired links. Here, extending the leader selection noted above, the nodes select leaders with multi-RAT support (operation 224). Again, leaders are selected in such a way that their cumulative coverage covers the target area.

The non-leader nodes may be informed of the leader nodes via the selection process, or via a control message. As the leaders are available during the wake periods of the serviced nodes, the nodes transmit MC notifications to the leader, which then relays the MC notification (operation 226), which is then received by other nodes (operation 228).

In an example, as described above, the leader, or other relay nodes, ret-transmit the MC notification a number of times based on the reliability and latency constraints of the MC notification (operation 230). These retransmissions may be received (operation 232), and the process repeated until the latency bound is met (e.g., time-out) or the target area is covered.

The PIT entries for this process are similar to those described above. The FIB entry for leaders may be different than those above to deal with the multiple radio interfaces. For example, FIB at Leader with two radios A and B may have the following FIB entries:

| FIB Example (Leader Nodes) | |
| --- | --- |
| Prefix | Face(s) |
| /MC-Proximity-Notification-Push-Relay--Prefix | Face-MC-Broadcast-RadioA |
| /MC-Proximity-Notification-Push-Relay--Prefix | Face-MC-Broadcast-RadioB |

In an analogous manner, support for non ICN nodes may be addressed via leader or relay nodes with dual connectivity. Here, the dual connectivity is betwixt ICN and some other internet layer protocol, such as IP. Again, these nodes may receive MC notifications on one stack and then inform other users on another stack.

Figure 3:
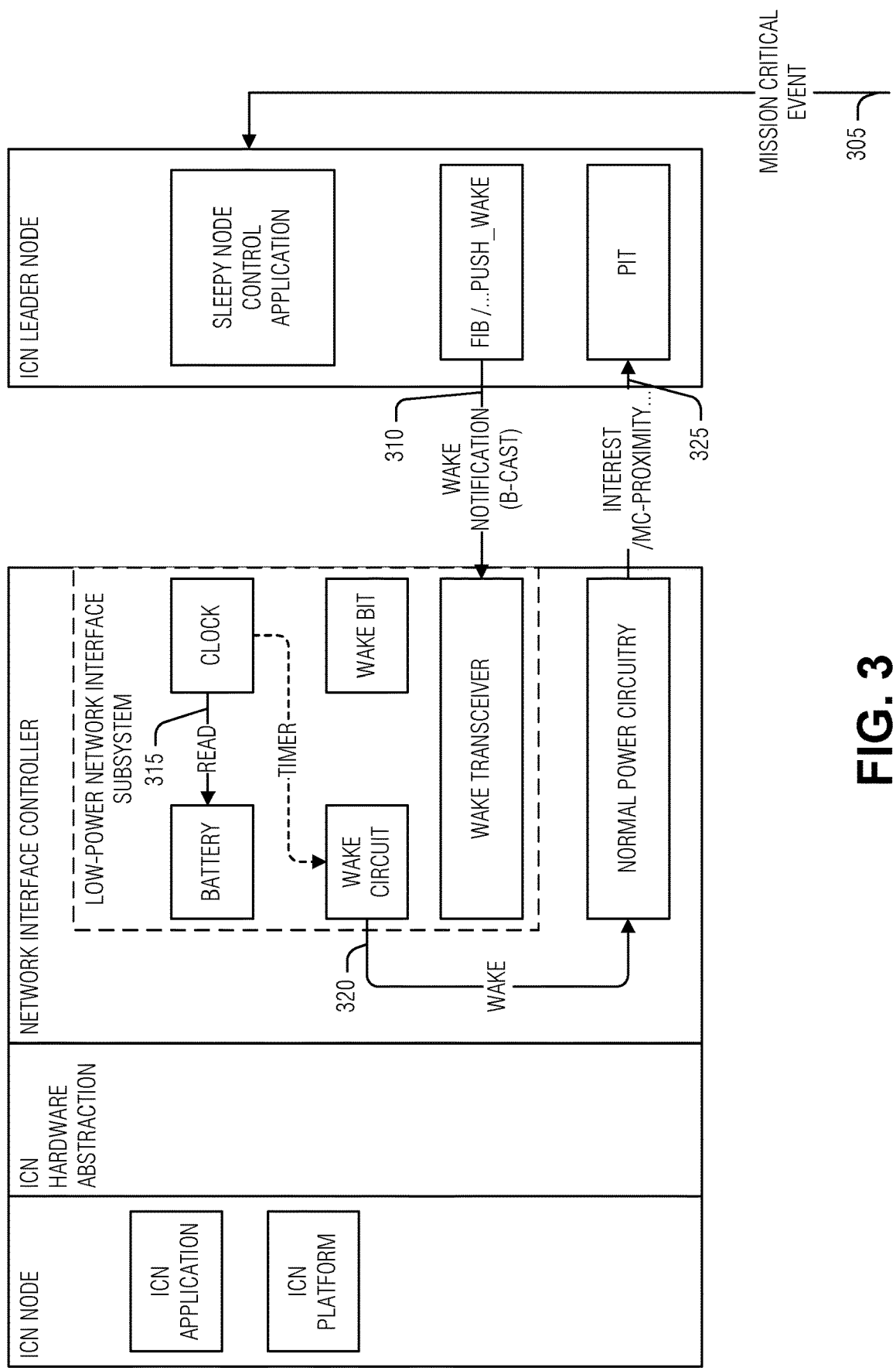
FIG. 3 is an example of a data flow for an MC event, according to an embodiment.

FIG. 3 is an example of a data flow for an MC event, according to an embodiment. As illustrated, the ICN nodes includes a low-power network interface controller that may monitor network broadcasts 310 containing wake notification messages sent by a leader node tasked with waking sleepy ICN nodes. This may be called a wake-on-MC-event feature. The sleepy (e.g., low-power state) node includes a low-power subsystem, which may include a battery, a clock, a wake circuit, a wake bit, and a wake transceiver. The wake circuit may periodically run on a timed interval or may run continuously in a low-energy mode. Here, the wake circuit may poll 315 the wake bit to determine if an MC event 305 has occurred. The wake transceiver may operate in low-power mode while the ICN node is sleeping to monitor the network interface for a wake-on-MC-event 310. The wake transceiver may run periodically—e.g., on a timed interval—to save power. As noted above, this interval is configurable and may be more frequent than the interval used to broadcast wake notification events. When the wake notification 310 is detected, the wake circuit wakes 320 the node to transmit 325 an interest for the MC event 305.

The ICN leader node may remain active on the network to detect and process mission critical events 305. The leader node may manage one or more sleepy nodes with a wake-on-MC-event capability. The leader node registers a sleepy node wake interface in its FIB for sleepy nodes called the /MC-Proximity Notification-Push-Wake prefix. When Leader receives the mission critical event 305, it responds by broadcasting 310, multicasting or otherwise communicating over a channel maintained by the low-power wake transceiver of the MC event 305. The message causes the wake bit to be set to TRUE on recipient ICN nodes.

As noted above, when the wake circuit reads 315 the wake bit and notes that it is now TRUE, the wake circuit wakes 320 the ICN node's normal power circuitry. This then responds by sending an ICN interest packet 325 to a leader node (or other relay node) to receive additional information regarding the MC event 305 and context for responding to the event.

Following the event processing, the wake bit is reset to FALSE and the ICN node resumes a normal sleep pattern. In an example, nodes may be registered with multiple leader nodes to accommodate mobility, network interference, or improve resilience. If a duplicate MC wake notification 310 is received while the first receipt is still processing (e.g. the wake bit is still TRUE) the duplicate is ignored. If the duplicate is received after the wake event 310 has been processed, the low power circuit may wake 320 the normal power circuitry to evaluate if the packet is a duplicate. Telemetry may be collected regarding habitually late duplicate events so that other network management steps may be taken.

Figure 4:
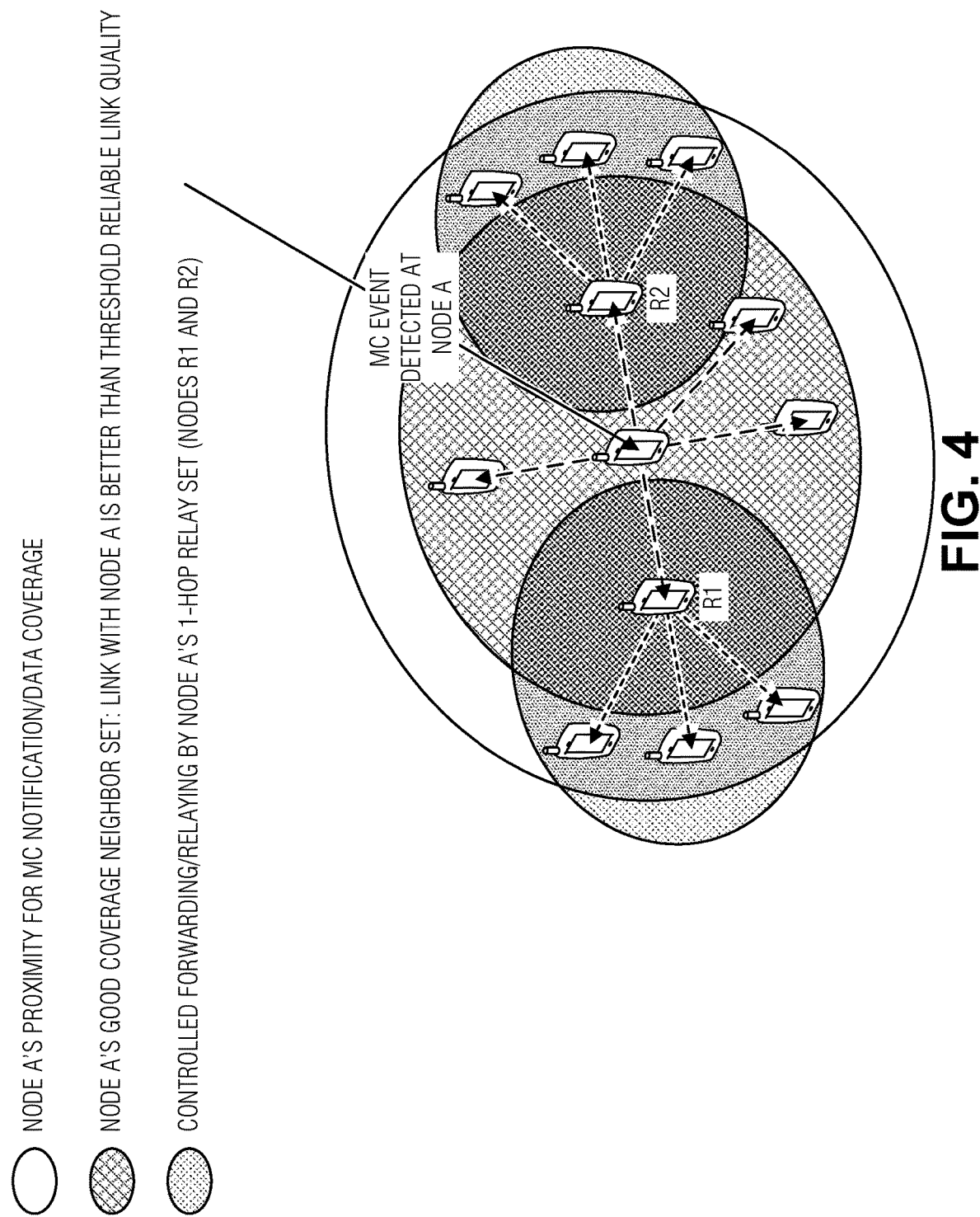
FIGS. 4 and 5 illustrate node relationships in an MC event, according to an embodiment.
Figure 5:
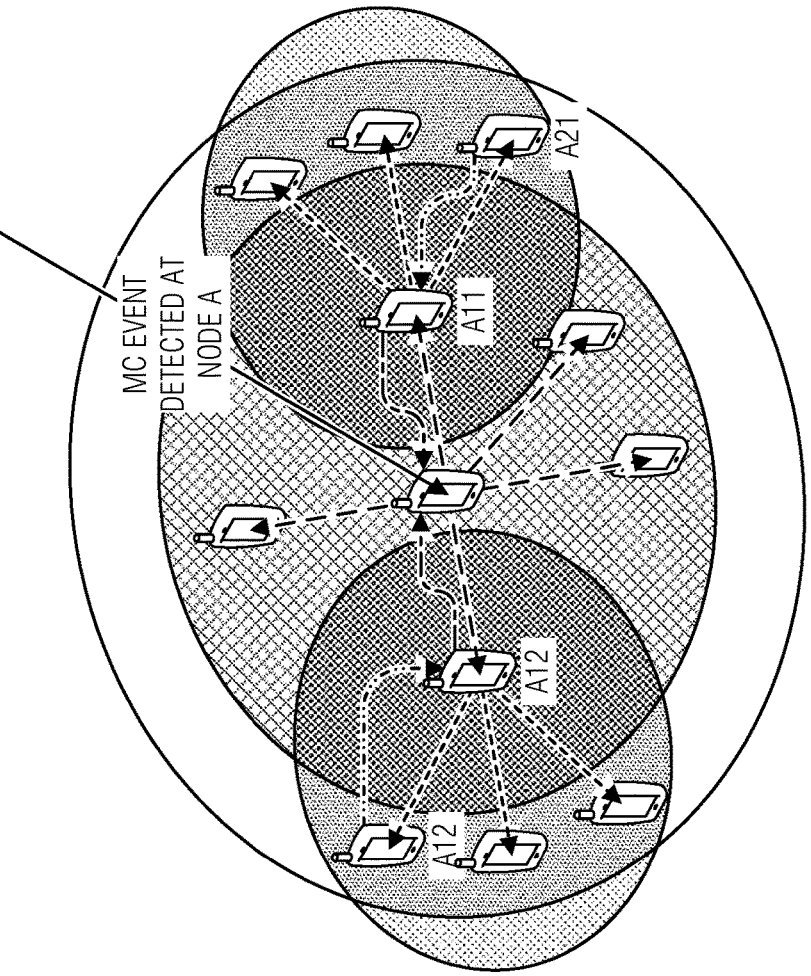

FIGS. 4 and 5 illustrate node relationships in an MC event, according to an embodiment. Node A, pictured in the middle, has neighbor nodes R1 and R2, which were selected as relay nodes to forward, relay, or re-broadcast the MC notification caused by Node A's detection of the MC event. Thus, as illustrated, Node A directly informs nodes in the good coverage neighbor set, and the relay nodes provide greater MC notification coverage via their respective 1-hop relay sets to establish the proximity coverage (e.g., target area) for Node A.

In an example, controlled relaying may be employed, along with an ACK Mechanism, to enhance reception coverage or reliability of the MC notification. Here, the intent is to successfully deliver the MC notification to all nodes in a target area. In cases of relay from leaders, each leader's transmission should be received by all nodes in its expected coverage. However, due to possibly dynamic network environments, some nodes may not always have good link quality, and hence may not be able to receive the MC notification. The leaders are used to overcome these challenges.

To select the leader, each node is configured with a peer-to-peer neighbors link (e.g., channel) measurement, and may share this measurement report sharing with its peers. The link quality measurement may be done either at lower network layers (e.g., a physical or media link layer) or a higher layer, such as by calculating ETX (expected transmission count) or the like.

Node A may divide neighbor nodes into two groups: a goodCoverageNeighborsSet—e.g., if a neighbor has a link with Node A better than thresholdReliableLinkQuality—and a weakCoverageNeighborsSet—e.g., if a neighbor has link with Node A worse than thresholdReliableLinkQuality. Node A may then select nodes for a 1HopRelayNeighborsSet from the goodCoverageNeighborsSetSet. The 1HopRelayNeighborsSet set may be selected as the smallest number of nodes where the greatest number of nodes in WeakCoverageNeighborsSet have good link quality (e.g., better than thresholdReliableLinkQuality) to at least one node in the 1HopRelayNeighborsSet. In an example, Node A may implement a 2-hop technique in the same manner, by selecting additional hop relay groups.

FIG. 5 illustrates an ACK technique for the relay selection illustrated in FIG. 4. Here, when Node A transmits an MC notification, there are many intended receivers to the broadcast. Generally, broadcast semantics do not entail acknowledgments (e.g., success or failure of the transmission) to the broadcast. However, for MC notifications attempting high reliability and low latency, it is useful to get feedback from one or more receivers so that a retransmission, if needed, is done immediately in case of reception failure at one or more receivers. However, feedback from all receivers results in an ACK flood and may consume significant transmission or processing overhead. Accordingly, Node A may establish a set of selected receivers, called the broadcastACKNeighborSet, to provide ACKs to the MC notification transmission. Upon receiving NACK from one or more nodes of a broadcastACKNeighborSet, Node A may re-transmit the MC notification immediately.

In an example, the 1HopRelayNeighborsSet may be configured as broadcastACKNeighborSetHop1. In an example, leader nodes that are in goodCoverageNeighborsSet of Node A, may be configured as the broadcastACKNeighborSetHop1.

In an example, nodes in broadcastACKNeighborSetHop1 are either informed about the selection broadcastACKNeighborSet in advance. In an example, node IDs of broadcastACKNeighborSet may be included in the packet header of MC notification.

In an example, Node A may also select second hop nodes to provides ACKs. Thus, Node A may select a broadcastACKNeighborSetHop1 and a broadcastACKNeighborSetHop2. Here, the broadcastACKNeighborSetHop2 includes of nodes in the weakCoverageNeighborsSet.

Figure 6:
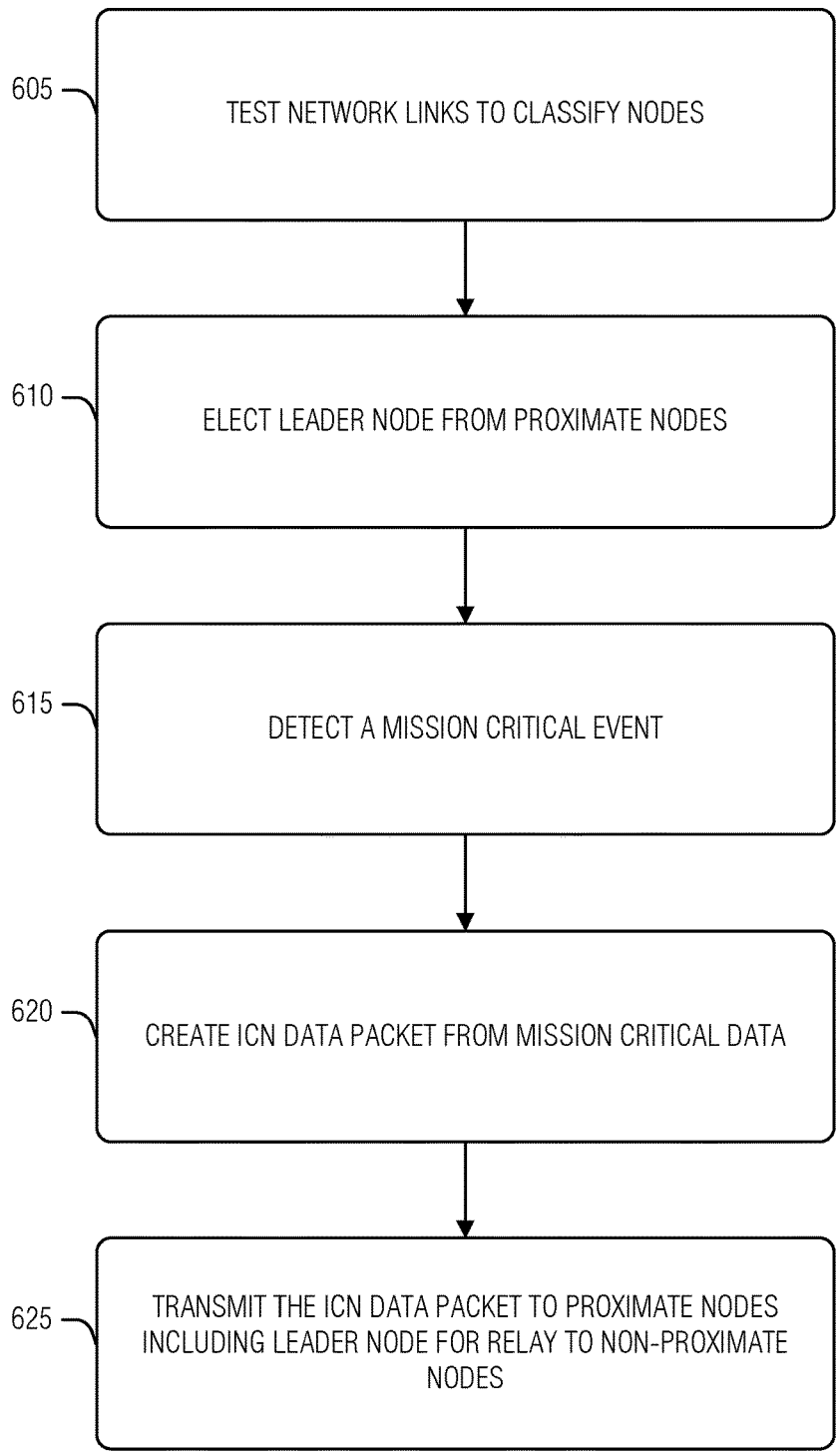
FIG. 6 is an example of a method for MC push notification in an HR ICN, according to an embodiment.

FIG. 6 is an example of a method 600 for MC push notification in an HR ICN, according to an embodiment. The operations of the method 600 are implemented in computing hardware, such as that described above in FIGS. 1 and 3-5, or, or below in FIGS. 7-8 (e.g., processing circuitry). The following operations are described from the perspective of a node.

At operation 605, the nodes tests network links to other nodes to classify the other nodes into proximate nodes and non-proximate nodes based on a reception metric. Example response metrics may include transmission time, round-trip time, processing latency, etc. In an example, the response metric may be measured by a physical or media link layer. In radio communications, for example, such a metric may include a received signal strength, or the like. Here, proximate nodes are outside a threshold of the metric and all other nodes that the node is aware of are classified as non-proximate nodes.

At operation 610, the node elects a set of leader nodes from the proximate nodes. As noted above, the leader nodes serve as relays, and perhaps more. As relays, the set leader nodes are selected by the node based on link quality between respective leader nodes and non-proximate nodes. In an example, the set of leader nodes is a minimum number of nodes to meet the reception metric for the non-proximate nodes. Thus, here, the leader nodes are proximate to the other nodes, which then may be considered within a 1-hop group of the node.

In an example, the set of leader nodes include nodes with multiple capabilities. In an example, the multiple capabilities include multi-RAT support. In an example, the multiple capabilities include multi-protocol support (e.g., ICN to IP). The addition of the multiple capabilities may be thought of as an extension to the transmission metric above. That is, in order to have 1-hop communication to a node operating on a different radio technology than the primary node, the intermediary must bridge the two RATs. This is similarly true to bridge between ICN and IP, for example. Thus, leadership elect criteria may rank multi-capability nodes higher than those nodes without such abilities.

At operation 615, an MC event is detected. Likely, the MC event is detected at a higher layer, such as an application layer, based on sensor data, for example. Once generated by the application layer, the node ICN layer receives notification that the event occurred, as well as data corresponding to the event. In an example, the application layer may provide some QoS data to accompany the MC data, such as a time or location in which the MC event data is relevant. These QoS parameters may then be converted by the ICN layer in the node as noted below.

At operation 620, the node created an ICN data packet that contains data from the MC event (e.g., the MC event data). In an example, QoS data is added to the ICN data packet. This QoS data may be derived from the MC event (e.g., from the application layer) or may be defined for the MC event service hosted by the node. In an example, the QoS data is at least one of a latency bound or of a hop count. These features may be used to govern how long, or how far, the MC data remains relevant.

At operation 625, the node transmits the ICN data packet. Being an ICN node, the ICN data packet is sent in accordance with a PIT entry. As noted elsewhere, the PIT entry establishes the "push" nature of the MC event transmission. The PIT entry is created to be long-lived and response to subscriptions for the MC event service hosted by the node. In an example, the PIT entry indicates transmission to the proximate nodes including the leader nodes—the leader nodes providing relay services (e.g., in accordance with the QoS factors) of the ICN data packet to the non-proximate nodes.

In an example, the PIT entry indicates a radio interface. In an example, the transmission includes performing a radio broadcast. Generally, in broadcast semantics, acknowledgments to data transmissions are not performed. However, in an example, only a set of acknowledgment nodes acknowledge receipt of the ICN data packet. This may enable faster retransmission in the case of receipt errors. In an example, the set of acknowledgment nodes are selected from the set of leader nodes.

As noted above, the PIT entry is a result of subscriptions for the MC event service of the node. However, signaling overhead may be reduced by creating the push PIT entry in response to a query of available MC event services. Thus, the node may receive a discovery interest packet (e.g., from a leader node in the set of leader nodes) and replay to the discovery interest packet with data about an MC service provided by the node. Then, in an example, the node adds the PIT entry in response to replying to the discovery packet. Here, the assumption is made that a node interested in the available services wants to be notified of events corresponding to those services.

Low-power devices may introduce some added complexity to ensure on-time reliable delivery of MC event data packets because a device may be sleeping during a transmission. The centralized nature of the elected leader nodes suggests a ready solution; the leader nodes coordinate sleep schedules to help reduce times in which recipient nodes are sleeping. Thus, in an example, the node may receive a sleep coordination schedule from a leader node in the set of leader nodes. The node may then adjust its sleep schedule in accordance with the sleep coordination schedule. In an example, the sleep coordination schedule aligns sleep schedules of the node and the other nodes such that at least one leader is awake when the node and the other nodes are awake. In an example, at least one leader is always awake. In an example, wake time intervals of the node and the other nodes are multiples of a smallest wake time interval of the node or the other nodes.

Figure 7:
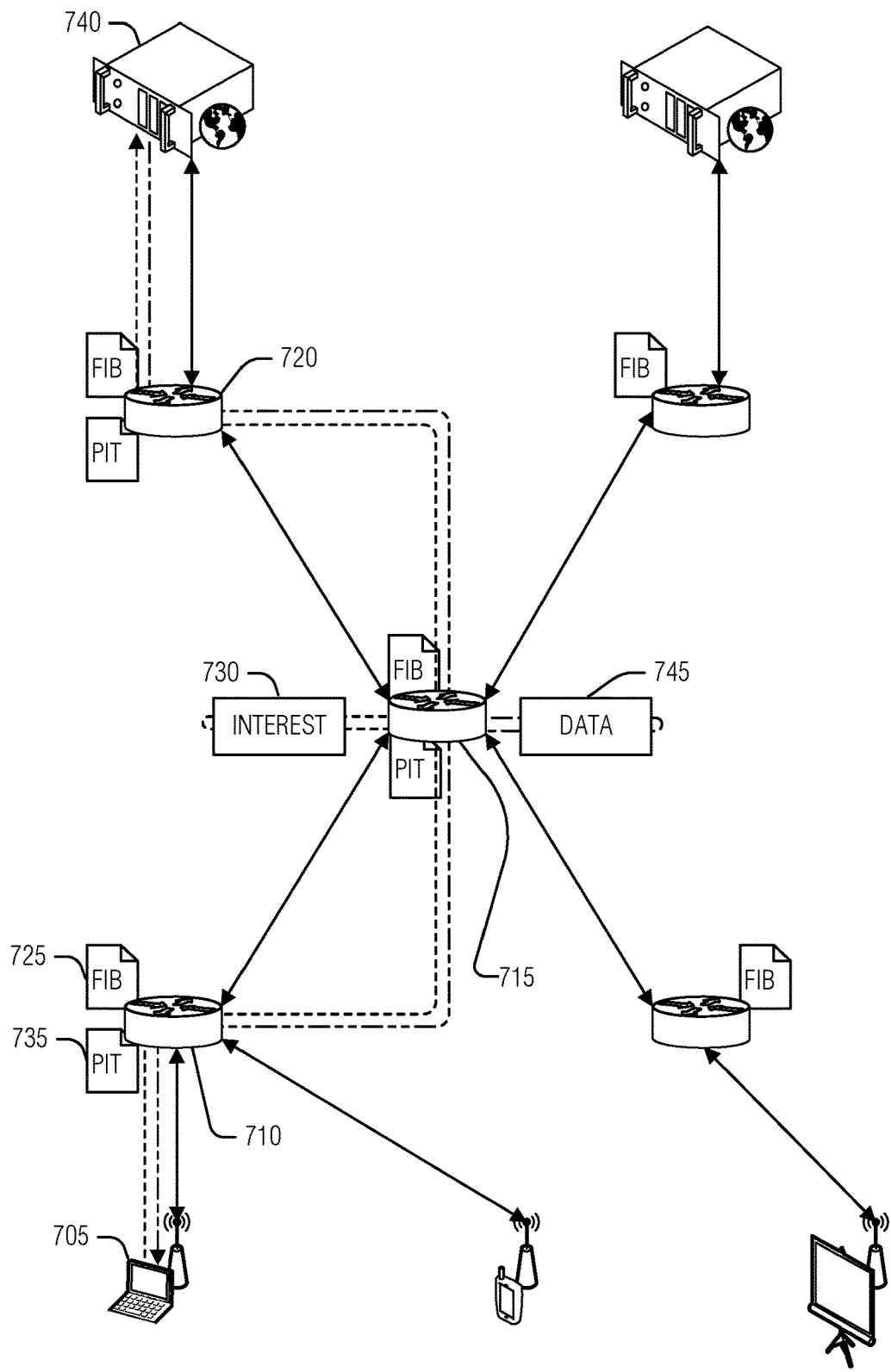
FIG. 7 illustrates an example ICN, according to an embodiment.
Figure 8:
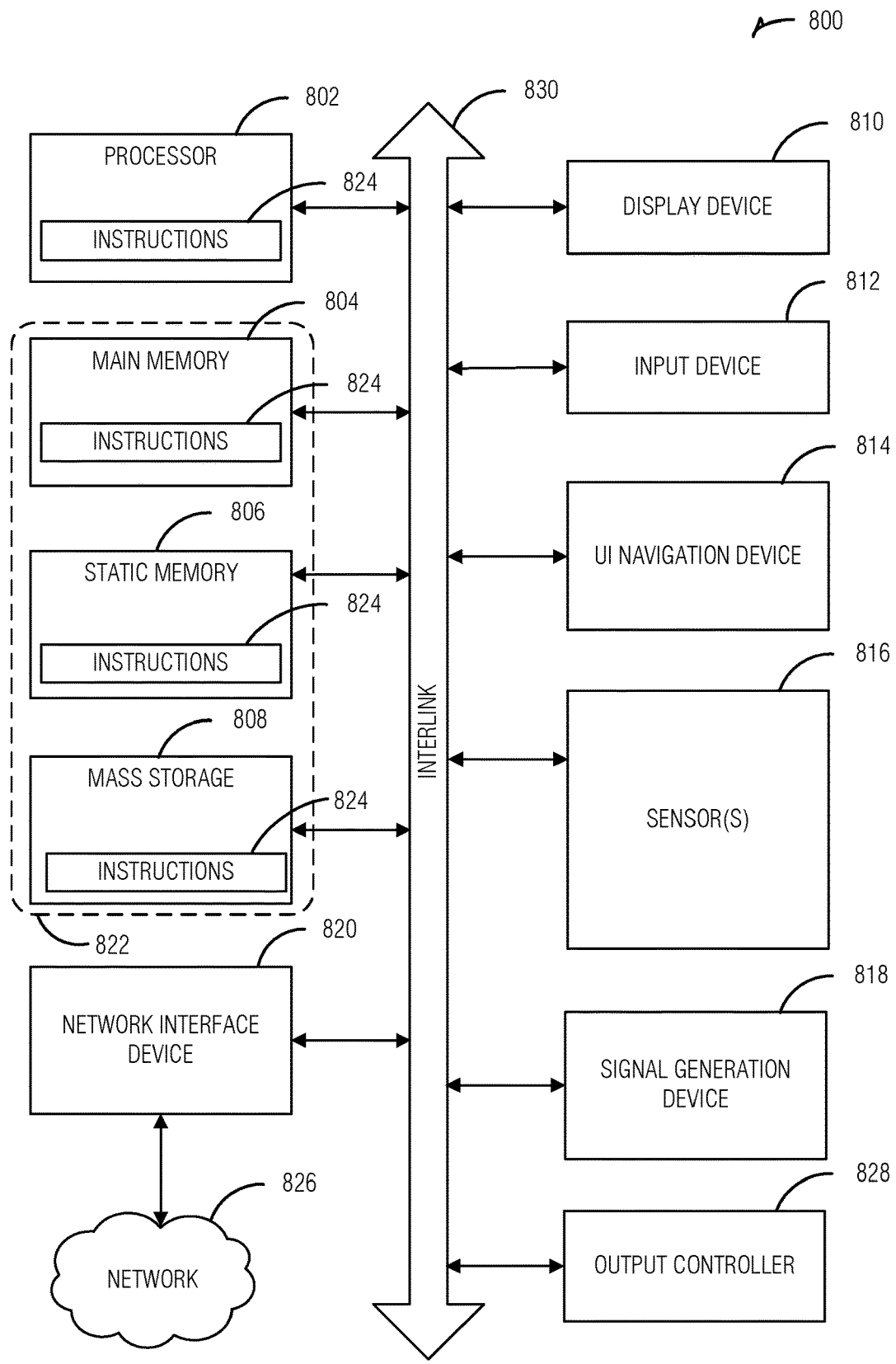
FIG. 8 is a block diagram illustrating an example of a machine upon which one or more embodiments may be implemented.

FIGS. 7 and 8 below provide additional details of the components in FIG. 1. For example, FIG. 7 illustrates several details and variations in ICNs. FIG. 8 illustrates several examples of computer hardware that may be used to implement any of the components illustrated in FIG. 1.

FIG. 7 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 705 (e.g., subscriber) requests named content from the network itself. The content request may be called an interest and transmitted via an interest packet 730. As the interest packet traverses network devices (e.g., network elements, routers, switches, hubs, etc.)—such as network elements 710, 715, and 720—a record of the interest is kept, for example, in a pending interest table (PIT) at each network element. Thus, network element 710 maintains an entry in its PIT 735 for the interest packet 730, network element 715 maintains the entry in its PIT, and network element 720 maintains the entry in its PIT.

When a device, such as publisher 740, that has content matching the name in the interest packet 730 is encountered, that device 740 may send a data packet 745 in response to the interest packet 730. Typically, the data packet 745 is tracked back through the network to the source (e.g., device 705) by following the traces of the interest packet 730 left in the network element PITs. Thus, the PIT 735 at each network element establishes a trail back to the subscriber 705 for the data packet 745 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 730 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 730 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 730 to data cached in the ICN element. Thus, for example, if the data 745 named in the interest 730 is cached in network element 715, then the network element 715 will return the data 745 to the subscriber 705 via the network element 710. However, if the data 745 is not cached at network element 715, the network element 715 routes the interest 730 on (e.g., to network element 720). To facilitate routing, the network elements may use a forwarding information base 725 (FIB) to match named data to an interface (e.g., physical port) for the route. Thus, the FIB 725 operates much like a routing table on a traditional network device.

In an example, additional meta-data may be attached to the interest packet 730, the cached data, or the route (e.g., in the FIB 725), to provide an additional level of matching. For example, the data name may be specified as "www.somedomain.com or videos or v8675309," but also include a version number—or timestamp, time range, endorsement, etc. In this example, the interest packet 730 may specify the desired name, the version number, or the version range. The matching may then locate routes or cached data matching the name and perform the additional comparison of meta-data or the like to arrive at an ultimate decision as to whether data or a route matches the interest packet 730 for respectively responding to the interest packet 730 with the data packet 745 or forwarding the interest packet 730.

ICN has advantages over host-based networking because the data segments are individually named. This enables aggressive caching throughout the network as a network element may provide a data packet 730 in response to an interest 730 as easily as an original author 740. Accordingly, it is less likely that the same segment of the network will transmit duplicates of the same data requested by different devices.

Fine grained encryption is another feature of many ICN networks. A typical data packet 745 includes a name for the data that matches the name in the interest packet 730. Further, the data packet 745 includes the requested data and may include additional information to filter similarly named data (e.g., by creation time, expiration time, version, etc.). To address malicious entities providing false information under the same name, the data packet 745 may also encrypt its contents with a publisher key or provide a cryptographic hash of the data and the name. Thus, knowing the key (e.g., from a certificate of an expected publisher 740) enables the recipient to ascertain whether the data is from that publisher 740. This technique also facilitates the aggressive caching of the data packets 745 throughout the network because each data packet 745 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a device for mission critical (MC) push notification mechanism in a high-reliability (HR) information centric network (ICN) node, the device comprising: processing circuitry; and a memory including instructions that configure the processing circuitry to: test network links to other nodes to classify the other nodes into proximate nodes and non-proximate nodes based on a reception metric; elect a set of leader nodes from the proximate nodes, the set of leader nodes selected by the node based on link quality between respective leader nodes and non-proximate nodes; detect an MC event; create an ICN data packet that contains data from the MC event; and transmit the ICN data packet, in accordance with a pending interest table (PIT) entry, to the proximate nodes including the set of leader nodes, the set of leader nodes to relay the ICN data packet to the non-proximate nodes.

In Example 2, the subject matter of Example 1, wherein, to transmit the ICN packet, the instructions configure the processing circuitry to perform a radio broadcast.

In Example 3, the subject matter of Example 2, wherein only a set of acknowledgment nodes acknowledge receipt of the ICN data packet.

In Example 4, the subject matter of Example 3, wherein the set of acknowledgment nodes are selected from the set of leader nodes.

In Example 5, the subject matter of any of Examples 1-4, wherein the set of leader nodes is a minimum number of nodes to meet the reception metric for the non-proximate nodes.

In Example 6, the subject matter of any of Examples 1-5, wherein the instructions configure the processing circuitry to: receive a discovery interest packet from a leader node in the set of leader nodes, the discovery request pertaining to MC services provided by the node; and reply to the discovery interest packet with data about an MC service provided by the node.

In Example 7, the subject matter of Example 6, wherein the instructions configure the processing circuitry to add the PIT entry in response to replying to the discovery packet.

In Example 8, the subject matter of Example 7, wherein the instructions configure the processing circuitry to: receive a sleep coordination schedule from a leader node in the set of leader nodes; and adjust the node's sleep schedule in accordance with the sleep coordination schedule.

In Example 9, the subject matter of any of Examples 7-8, wherein the sleep coordination schedule aligns sleep schedules of the node and the other nodes such that at least one leader is awake when the node and the other nodes are awake.

In Example 10, the subject matter of Example 9, wherein at least one leader is always awake.

In Example 11, the subject matter of any of Examples 9-10, wherein wake time intervals of the node and the other nodes are multiples of a smallest wake time interval of the node or the other nodes.

In Example 12, the subject matter of any of Examples 1-11, wherein, to create the ICN data packet, the instructions configure the processing circuitry to encode quality of service (QoS) parameters into the ICN data packet.

In Example 13, the subject matter of Example 12, wherein the QoS parameters include at least one of a latency bound or of a hop count.

Example 14 is a method for mission critical (MC) push notification mechanism in a high-reliability (HR) information centric network (ICN), the method comprising: testing, by a node, network links to other nodes to classify the other nodes into proximate nodes and non-proximate nodes based on a reception metric; electing, by the node, a set of leader nodes from the proximate nodes, the set of leader nodes selected by the node based on link quality between respective leader nodes and non-proximate nodes; detecting an MC event; creating an ICN data packet that contains data from the MC event; and transmitting the ICN data packet, in accordance with a pending interest table (PIT) entry, to the proximate nodes including the set of leader nodes, the set of leader nodes to relay the ICN data packet to the non-proximate nodes.

In Example 15, the subject matter of Example 14, wherein transmitting the ICN packet includes performing a radio broadcast.

In Example 16, the subject matter of Example 15, wherein only a set of acknowledgment nodes acknowledge receipt of the ICN data packet.

In Example 17, the subject matter of Example 16, wherein the set of acknowledgment nodes are selected from the set of leader nodes.

In Example 18, the subject matter of any of Examples 14-17, wherein the set of leader nodes is a minimum number of nodes to meet the reception metric for the non-proximate nodes.

In Example 19, the subject matter of any of Examples 14-18, comprising: receiving a discovery interest packet from a leader node in the set of leader nodes, the discovery request pertaining to MC services provided by the node; and replying to the discovery interest packet with data about an MC service provided by the node.

In Example 20, the subject matter of Example 19, comprising adding the PIT entry in response to replying to the discovery packet.

In Example 21, the subject matter of Example 20, comprising: receiving a sleep coordination schedule from a leader node in the set of leader nodes; and adjusting the node's sleep schedule in accordance with the sleep coordination schedule.

In Example 22, the subject matter of any of Examples 20-21, wherein the sleep coordination schedule aligns sleep schedules of the node and the other nodes such that at least one leader is awake when the node and the other nodes are awake.

In Example 23, the subject matter of Example 22, wherein at least one leader is always awake.

In Example 24, the subject matter of any of Examples 22-23, wherein wake time intervals of the node and the other nodes are multiples of a smallest wake time interval of the node or the other nodes.

In Example 25, the subject matter of any of Examples 14-24, wherein creating the ICN data packet includes encoding quality of service (QoS) parameters into the ICN data packet.

In Example 26, the subject matter of Example 25, wherein the QoS parameters include at least one of a latency bound or of a hop count.

Example 27 is at least one machine-readable medium including instructions for mission critical (MC) push notification mechanism in a high-reliability (HR) information centric network (ICN), the instructions, when executed by processing circuitry of a node, cause the processing circuitry to perform operations comprising: testing network links to other nodes to classify the other nodes into proximate nodes and non-proximate nodes based on a reception metric; electing a set of leader nodes from the proximate nodes, the set of leader nodes selected by the node based on link quality between respective leader nodes and non-proximate odes; detecting an MC event; creating an ICN data packet that contains data from the MC event; and transmitting the ICN data packet, in accordance with a pending interest table (PIT) entry, to the proximate nodes including the set of leader nodes, the set of leader nodes to relay the ICN data packet to the non-proximate nodes.

In Example 28, the subject matter of Example 27, wherein transmitting the ICN packet includes performing a radio broadcast.

In Example 29, the subject matter of Example 28, wherein only a set of acknowledgment nodes acknowledge receipt of the ICN data packet.

In Example 30, the subject matter of Example 29, wherein the set of acknowledgment nodes are selected from the set of leader nodes.

In Example 31, the subject matter of any of Examples 27-30, wherein the set of leader nodes is a minimum number of nodes to meet the reception metric for the non-proximate nodes.

In Example 32, the subject matter of any of Examples 27-31, wherein the operations comprise: receiving a discovery interest packet from a leader node in the set of leader nodes, the discovery request pertaining to MC services provided by the node; and replying to the discovery interest packet with data about an MC service provided by the node.

In Example 33, the subject matter of Example 32, wherein the operations comprise adding the PIT entry in response to replying to the discovery packet.

In Example 34, the subject matter of Example 33, wherein the operations comprise: receiving a sleep coordination schedule from a leader node in the set of leader nodes; and adjusting the node's sleep schedule in accordance with the sleep coordination schedule.

In Example 35, the subject matter of any of Examples 33-34, wherein the sleep coordination schedule aligns sleep schedules of the node and the other nodes such that at least one leader is awake when the node and the other nodes are awake.

In Example 36, the subject matter of Example 35, wherein at least one leader is always awake.

In Example 37, the subject matter of any of Examples 35-36, wherein wake time intervals of the node and the other nodes are multiples of a smallest wake time interval of the node or the other nodes.

In Example 38, the subject matter of any of Examples 27-37, wherein, to create the ICN data packet, the instructions configure the processing circuitry to encode quality of service (QoS) parameters into the ICN data packet.

In Example 39, the subject matter of Example 38, wherein the QoS parameters include at least one of a latency bound or of a hop count.

Example 40 is a system for mission critical (MC) push notification mechanism in a high-reliability (HR) information centric network (ICN), the system comprising: means for testing, by a node, network links to other nodes to classify the other nodes into proximate nodes and non-proximate nodes based on a reception metric; means for electing, by the node, a set of leader nodes from the proximate nodes, the set of leader nodes selected by the node based on link quality between respective leader nodes and non-proximate nodes; means for detecting an MC event; means for creating an ICN data packet that contains data from the MC event; and means for transmitting the ICN data packet, in accordance with a pending interest table (PIT) entry, to the proximate nodes including the set of leader nodes, the set of leader nodes to relay the ICN data packet to the non-proximate nodes.

In Example 41, the subject matter of Example 40, wherein the means for transmitting the ICN packet include means for performing a radio broadcast.

In Example 42, the subject matter of Example 41, wherein only a set of acknowledgment nodes acknowledge receipt of the ICN data packet.

In Example 43, the subject matter of Example 42, wherein the set of acknowledgment nodes are selected from the set of leader nodes.

In Example 44, the subject matter of any of Examples 40-43, wherein the set of leader nodes is a minimum number of nodes to meet the reception metric for the non-proximate nodes.

In Example 45, the subject matter of any of Examples 40-44, comprising: means for receiving a discovery interest packet from a leader node in the set of leader nodes, the discovery request pertaining to MC services provided by the node; and means for replying to the discovery interest packet with data about an MC service provided by the node.

In Example 46, the subject matter of Example 45, comprising means for adding the PIT entry in response to replying to the discovery packet.

In Example 47, the subject matter of Example 46, comprising: means for receiving a sleep coordination schedule from a leader node in the set of leader nodes; and means for adjusting the node's sleep schedule in accordance with the sleep coordination schedule.

In Example 48, the subject matter of any of Examples 46-47, wherein the sleep coordination schedule aligns sleep schedules of the node and the other nodes such that at least one leader is awake when the node and the other nodes are awake.

In Example 49, the subject matter of Example 48, wherein at least one leader is always awake.

In Example 50, the subject matter of any of Examples 48-49, wherein wake time intervals of the node and the other nodes are multiples of a smallest wake time interval of the node or the other nodes.

In Example 51, the subject matter of any of Examples 40-50, wherein creating the ICN data packet includes encoding quality of service (QoS) parameters into the ICN data packet.

In Example 52, the subject matter of Example 51, wherein the QoS parameters include at least one of a latency bound or of a hop count.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for mission critical (MC) push notification mechanism in a high-reliability (HR) information centric network (ICN) node, the device comprising:
   processing circuitry; and
   a memory including instructions that configure the processing circuitry to:
      test network links to other nodes to classify the other nodes into proximate nodes and non-proximate nodes based on a reception metric;
      elect, in negotiation with proximate nodes for selection of leader nodes, a set of leader nodes from the proximate nodes, the set of leader nodes selected by the node based on link quality between respective leader nodes and non-proximate nodes, based on coverage capability, and based on duplex capability;
      receive notification of selection as a relay for an MC service;
      add a non-expiring forwarding information base (FIB) entry for the MC service based on receipt of the notification of the selection as the relay, the FIB entry including a name prefix match for the MC service and an outbound interface;
      forward received ICN interest packets that match the name prefix for the MC service out the outbound interface of the FIB entry;
      detect an event that corresponds to the MC service;
      create an ICN data packet that contains data from the event; and
      transmit the ICN data packet, in accordance with a pending interest table (PIT) entry, to the proximate nodes including the set of leader nodes, the set of leader nodes to relay the ICN data packet to the non-proximate nodes, wherein the PIT entry is a non-expiring PIT entry with a name that includes a prefix for a proximity notification push for the MC service.

2. The device of claim 1, wherein, to transmit the ICN packet, the instructions configure the processing circuitry to perform a radio broadcast.

3. The device of claim 2, wherein only a se of acknowledgment nodes acknowledge receipt of the ICN data packet.

4. The device of claim 1, wherein the instructions configure the processing circuitry to:
   receive a discovery interest packet from a leader node in the set of leader nodes, the discovery interest packet pertaining to services provided by the node; and
   reply to the discovery interest packet with data about a service provided by the node.

5. The device of claim 4, wherein the instructions configure the processing circuitry to add the PIT entry in response to replying to the discovery interest packet.

6. The device of claim 5, wherein the instructions configure the processing circuitry to:
   receive a sleep coordination schedule from a leader node in the set of leader nodes; and
   adjust a sleep schedule of the node in accordance with the sleep coordination schedule.

7. The device of claim 6, wherein the sleep coordination schedule aligns sleep schedules of the node and the other nodes such that at least one leader is awake when the node and the other nodes are awake.

8. The device of claim 1, wherein, to create the ICN data packet, the instructions configure the processing circuitry to encode quality of service (QoS) parameters into the ICN data packet.

9. A method for mission critical (MC) push notification mechanism in a high-reliability (HR) information centric network (ICN), the method comprising:
   testing, by a node, network links to other nodes to classify the other nodes into proximate nodes and non-proximate nodes based on a reception metric;
   electing, in negotiation with proximate nodes for selection of leader nodes, a set of leader nodes from the proximate nodes, the set of leader nodes selected by the node based on link quality between respective leader nodes and non-proximate nodes, based on coverage capability, and based on duplex capability;
   receive notification of selection as a relay for an MC service;
   adding a non-expiring forwarding information base (FIB) entry for the MC service based on receipt of the notification of the selection as the relay, the FIB entry including a name prefix match for the MC service and an outbound interface;
   forwarding received ICN interest packets that match the name prefix for the MC service out the outbound interface of the FIB entry;
   detecting an event that corresponds to the MC service;

creating an ICN data packet that contains data from the event; and transmitting the ICN data packet, in accordance with a pending interest table (PIT) entry, to the proximate nodes including the set of leader nodes, the set of leader nodes to relay the ICN data packet to the non-proximate nodes, wherein the PIT entry is a non-expiring PIT entry with a name that includes a prefix for a proximity notification push for the MC service.

10. The method of claim 9, wherein transmitting the ICN packet includes performing a radio broadcast.

11. The method of claim 10, wherein only a set of acknowledgment nodes acknowledge receipt of the ICN data packet.

12. The method of claim 9, comprising:

receiving a discovery interest packet from a leader node in the set of leader nodes, the discovery interest packet pertaining to services provided by the node; and replying to the discovery interest packet with data about a service provided by the node.

13. The method of claim 12, comprising adding the PIT entry in response to replying to the discovery interest packet.

14. The method of claim 13, comprising:

receiving a sleep coordination schedule from a leader node in the set of leader nodes; and adjusting a sleep schedule of the node in accordance with the sleep coordination schedule.

15. The method of claim 14, wherein the sleep coordination schedule aligns sleep schedules of the node and the other nodes such that at least one leader is awake when the node and the other nodes are awake.

16. The method of claim 9, wherein creating the ICN data packet includes encoding quality of service (QoS) parameters into the ICN data packet.

17. At least one non-transitory machine-readable medium including instructions for mission critical (MC) push notification mechanism in a high-reliability (HR) information centric network (ICN), the instructions, when executed by processing circuitry of a node, cause the processing circuitry to perform operations comprising:

testing network links to other nodes to classify the other nodes into proximate nodes and non-proximate nodes based on a reception metric;

electing, in negotiation with proximate nodes for selection of leader lodes, a set of leader nodes from the proximate nodes, the set of leader nodes selected by the node based on link quality between respective leader nodes and non-proximate nodes, based on coverage capability, and based on duplex capability:

receive notification of selection as a relay for an MC service;

adding a non-expiring forwarding information base (FIB) entry for the MC service based on receipt of the notification of the selection as the relay, the FIB entry including a name prefix match for the MC service and an outbound interface;

forwarding received ICN interest packets that match the name prefix for the MC service out the outbound interface of the FIB entry;

detecting an event that corresponds to the MC service;

creating an ICN data packet that contains data from the event; and transmitting the ICN data packet, in accordance with a pending interest table (PIT) entry, to the proximate nodes including the set of leader nodes, the set of leader nodes to relay the ICN data packet to the non-proximate nodes, wherein the PIT entry is a non-expiring PIT entry with a name that includes a prefix for a proximity notification push for the MC service.

18. The at least one non-transitory machine-readable medium of claim 17, wherein transmitting the ICN packet includes performing a radio broadcast.

19. The at least one non-transitory machine-readable medium of claim 18, wherein only a set of acknowledgment nodes acknowledge receipt of the ICN data packet.

20. The at least one non-transitory machine-readable medium of claim 17, wherein the operations comprise:

receiving a discovery interest packet from a leader node in the set of leader nodes, the discovery interest packet pertaining to services provided by the node; and replying to the discovery interest packet with data about a service provided by the node.

21. The at least one non-transitory machine-readable medium of claim 20, wherein the operations comprise adding the PIT entry in response to replying to the discovery interest packet.

22. The at least one non-transitory machine-readable medium of claim 21, wherein the operations comprise:

receiving a sleep coordination schedule from a leader node in the set of leader nodes; and adjusting a sleep schedule of the node in accordance with the sleep coordination schedule.

23. The at least one non-transitory machine-readable medium of claim 22, wherein the sleep coordination schedule aligns sleep schedules of the node and the other nodes such that at least one leader is awake when the node and the other nodes are awake.

24. The at least one non-transitory machine-readable medium of claim 17, wherein, to create the ICN data packet, the instructions configure the processing circuitry, to encode quality of service (QoS) parameters into the ICN data packet.

* * * * *

UNITED STATES PATENT AND TRADEMARK OFFICE
CERTIFICATE OF CORRECTION

PATENT NO. : 11,140,025 B2  
APPLICATION NO. : 16/456443  
DATED : October 5, 2021  
INVENTOR(S) : Jha et al.

Page 1 of 1

It is certified that error appears in the above-identified patent and that said Letters Patent is hereby corrected as shown below:

In the Claims

In Column 22, Line 19, in Claim 3, delete "se" and insert --set-- therefor

In Column 23, Line 46, in Claim 17, delete "Iodes," and insert --nodes,-- therefor In Column 23, Line 50, in Claim 17, delete "capability:" and insert --capability;-- therefor In Column 24, Line 48, in Claim 24, delete "circuitry," and insert --circuitry-- therefor Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*